(12) United States Patent
Sinquin et al.

(10) Patent No.: US 7,782,526 B2
(45) Date of Patent: Aug. 24, 2010

(54) PIEZOELECTRIC ADAPTIVE MIRROR

(75) Inventors: Jean-Christophe Sinquin, Itteville (FR); Jean-Marie Lurcon, Nozay (FR); Claude Guillemard, Ollainville (FR)

(73) Assignee: Compagnie Industrielle des Lasers Cilas, Orleans (FR)

(*) Notice: Subject to any disclaimer, the term of this patent is extended or adjusted under 35 U.S.C. 154(b) by 185 days.

(21) Appl. No.: 12/038,735

(22) Filed: Feb. 27, 2008

(65) Prior Publication Data

US 2008/0204844 A1 Aug. 28, 2008

(30) Foreign Application Priority Data

Feb. 28, 2007 (FR) .................................. 07 01439

(51) Int. Cl.
*G02B 26/00* (2006.01)
(52) U.S. Cl. ..................................................... 359/297
(58) Field of Classification Search ................ 359/290, 359/291, 292, 293, 298, 297, 223, 224, 324; 310/309, 310, 320

See application file for complete search history.

(56) References Cited

U.S. PATENT DOCUMENTS 5,745,278 A * 4/1998 La Fiandra ............... 359/224.1
2003/0001454 A1 1/2003 Takeuchi

FOREIGN PATENT DOCUMENTS

| EP | 0 793120 | 9/1997 |
|---|---|---|
| EP | 0936684 | 8/1999 |
| EP | 1408561 | 4/2004 |
| EP | 1432048 | 6/2004 |
| JP | 2005-043544 | 2/2005 |

OTHER PUBLICATIONS

Preliminary Search Report dated Oct. 16, 2007, in English.

* cited by examiner

*Primary Examiner*—Timothy J Thompson
*Assistant Examiner*—Tuyen Q Tra
(74) *Attorney, Agent, or Firm*—Dickinson Wright PLLC

(57) ABSTRACT

An adaptive mirror includes a plurality of adjacent combs of piezoelectric material and two electrodes arranged on longitudinal faces opposite a bar are associated with each monolithic bar formed by a tooth of the combs.

8 Claims, 2 Drawing Sheets

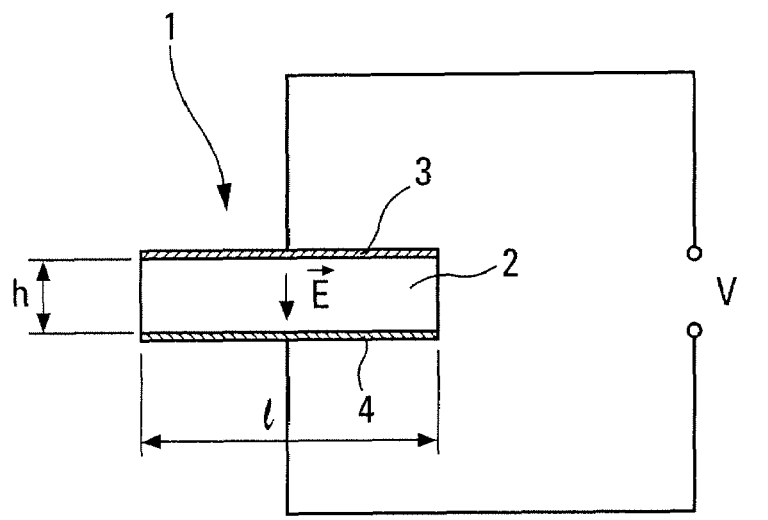
Fig. 1
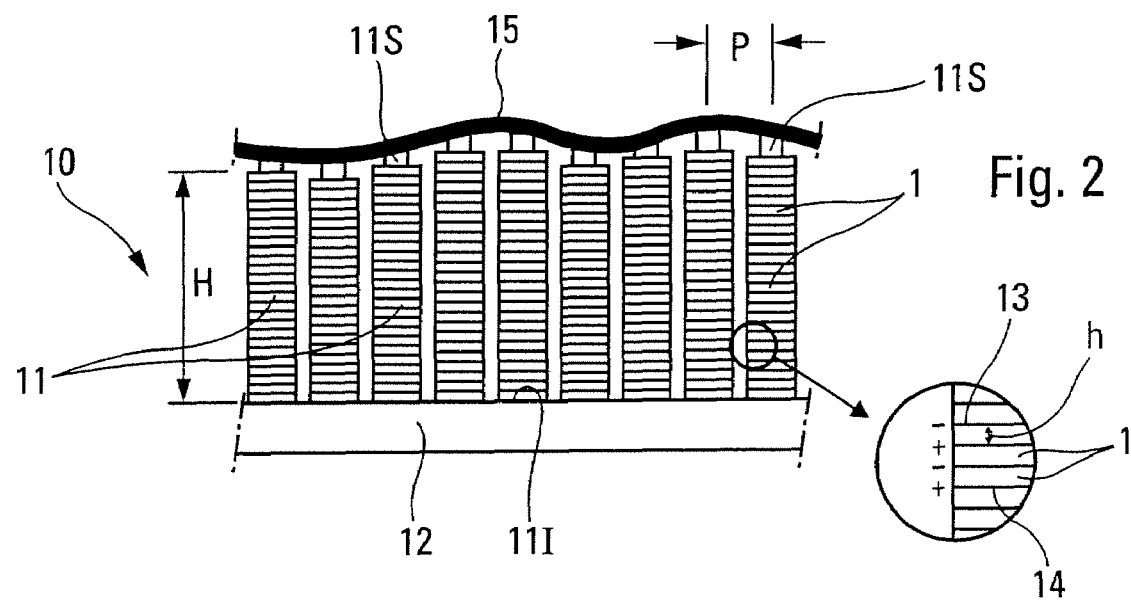
Fig. 2
Fig. 2A

PIEZOELECTRIC ADAPTIVE MIRROR

FIELD OF THE INVENTION

The present invention concerns an adaptive mirror, that is a deformable mirror intended to be used in an optical system to correct the distortion of an incident wavefront in real time and therefore to maintain optimal performance of said optical system.

BACKGROUND OF THE RELATED ART

Already known, for example from document EP-0 793 120, is an adaptive mirror comprising:
- a plurality of bar-shaped piezoelectric actuators joined to a rigid base by one of their ends and provided with electrodes by virtue of which electrical voltages can be applied to said piezoelectric actuators to generate electric fields therein; and
- a flexible reflecting surface, borne by the other of the ends of said piezoelectric actuators and able to be locally deformed by each of these, the length of which varies under the action of said electric fields.

Furthermore, it is known that variation in the length of a block of piezoelectric material parallel to the direction of the electric field applied to it depends on the electrical voltage generating said field, but is independent of this length.

Therefore, in the known adaptive mirror recalled hereinabove, in order to obtain a sufficient stroke for the end of each piezoelectric bar linked to said flexible reflecting surface to be deformed, it is necessary for said bar to consist of a stack of a plurality of piezoelectric elements, each of which is provided with a pair of electrodes, such that the stroke of said bar can be equal to the sum of the variations in thickness of said elements.

In this way, the larger the number of elements itself, the greater is the stroke of the composite piezoelectric bars. However, if the number of stacked elements is high, it is necessary for said stacked elements to have a large area to ensure a foundation sufficient for said composite bars. It is therefore impossible to obtain small pitch of said piezoelectric bars on said rigid base.

In these known adaptive mirrors a compromise must therefore be respected between the stroke and the pitch desired for the bars. In practice the minimum pitch that can be obtained is of the order of 3 mm for a stroke of the order of several micrometers.

However, numerous applications of adaptive optics require pitches of the piezoelectric bars of the order of 1 mm, again for a stroke of the order of several micrometers.

SUMMARY OF THE INVENTION

The object of the present invention is to overcome the drawbacks of the prior art and allow production of adaptive mirrors in which the pitch of the piezoelectric bars is small, the latter nonetheless having an appropriate stroke.

To this end, according to the invention, the adaptive mirror of the type described above is noteworthy in that:
- it comprises a plurality of monolithic combs of piezoelectric material placed side by side and attached to one another, each comb comprising teeth forming monolithic bars and a back forming a slice of said base; and
- each monolithic bar of piezoelectric material is provided with two electrodes on opposing longitudinal faces to form one of said actuators.

Thus, in the present invention, due to the production of the bars in the form of teeth of monolithic combs, these bars can be given a cross section smaller than that of the composite bars of the prior art for strokes of the same order, notably due to the fact that said monolithic bars have good rigidity.

In the present invention the transverse piezoelectric effect is therefore employed, in contrast to the previously known composite bar technique which uses the direct piezoelectric effect.

It will be noted that the document EP-1 432 048 already discloses a piezoelectric actuator using the transverse piezoelectric effect and consisting of a matrix of monolithic piezoelectric bars. However, in this document each of said bars is fixed to the base via means of fixation, which limits the possibilities for reducing the pitch of said bars.

In the mirror according to the present invention the matrix of monolithic bars is simply formed by assembly, for example by bonding, of the backs of a plurality of monolithic combs.

Preferably, electrically insulating spacers are arranged between said adjacent monolithic combs and said monolithic bars are square in section.

It will also be noted that the architecture of said adaptive mirror according to the invention is particularly simple since each actuator is monolithic and comprises only a single pair of electrodes, whereas each actuator of the prior art consists of a stack of a plurality of piezoelectric elements and therefore comprises a still larger number of electrodes.

BRIEF DESCRIPTION OF THE DRAWINGS

The way the present invention can be realized will be well understood from the attached figures. In these figures identical references refer to like elements.

FIG. 1 is an electrical diagram for explaining the direct piezoelectric effect and the transverse piezoelectric effect.

FIG. 2 is a diagram illustrating the structure of known piezoelectric adaptive mirrors.

FIG. 2A is an enlargement of a part of FIG. 2.

DETAILED DESCRIPTION OF THE INVENTION

Figure 3:
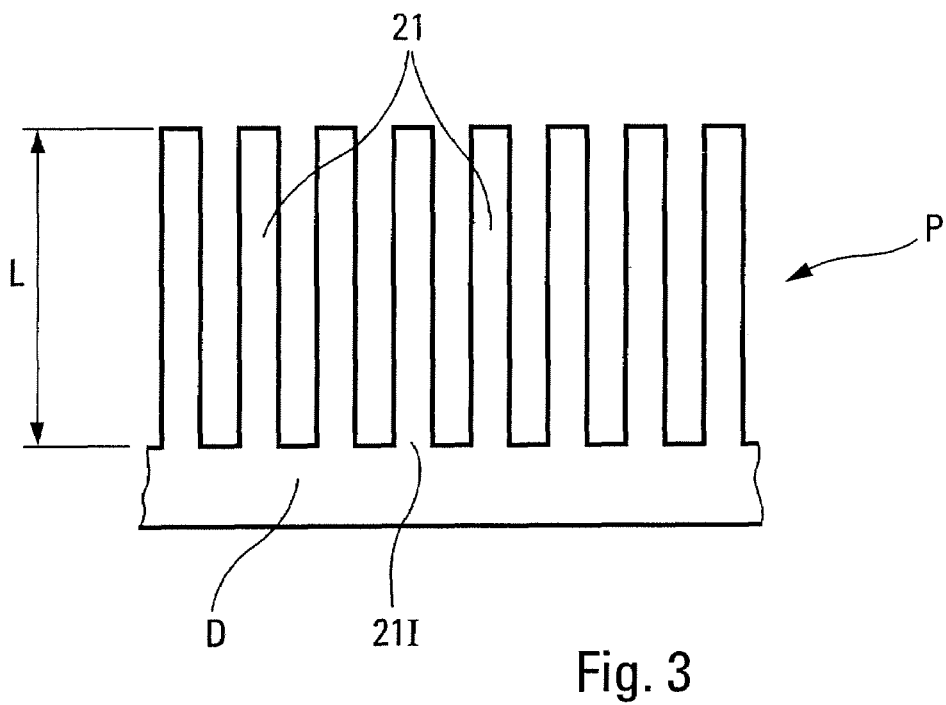
FIG. 3 is a front view of a monolithic comb in accordance with the present invention.

The piezoelectric element 1, represented in cross section in FIG. 1, comprises a monolithic wafer 2 of piezoelectric material on two opposing faces of which two parallel opposing electrodes 3 and 4 are arranged. The height of the wafer 2, referred to as h, corresponds to the distance between said electrodes 3 and 4. The wafer 2 has a cross section of length l and of width x. This width x is orthogonal to the plane of, but is not visible in, FIG. 1.

If an electrical voltage V is applied between the opposing electrodes 3 and 4, this results in the wafer 2 being subjected to an electric field $\vec{E}$ in a direction orthogonal to said electrodes 3, 4.

Parallel to the height h, the wafer is then, under the direct piezoelectric effect, undergoes a variation in height dh such that $dh/h = d_{33}E$, in which expression $d_{33}$ denotes the direct charge coefficient of the piezoelectric material of the wafer 2.

Now, the amplitude E of the field $\vec{E}$ is equal to V/h, so that dh is equal to the product $d_{33}V$.

Thus, the variation dh in the height h under the influence of the electrical voltage V is an increasing function of this voltage V, but is independent of the height h.

FIG. 2 schematically represents an adaptive mirror 10 of the known type comprising:
- a plurality of bar-formed piezoelectric actuators 11 of height H, arranged for example in a matrix, joined to a rigid base 12 by one of their ends 11I and provided with electrodes 13, 14 by virtue of which electrical voltages can be applied to said piezoelectric actuators 11 to generate electric fields therein; and
- a flexible reflecting surface 15, borne by the other end 11S of said piezoelectric actuators 11 and able to be locally deformed by each of the latter, the height of which varies under the action of said electric fields.

In order for the adaptive mirror 10 to be operational, it is vital that the variation in height dH of each piezoelectric actuator 11 is sufficiently large. For, as seen above with regard to FIG. 1, the variation in height of a block of piezoelectric material through the direct piezoelectric effect is independent of the height of this block.

Therefore, to obtain a desirable large variation height dH, each piezoelectric actuator 11 is formed in the known way by stacking a high number N of identical piezoelectric elements, similar to the element 1. The electrodes 13, 14 are then formed by the number of electrodes 3, 4 of said constituent elements 1. In this way the height H of each actuator 11 is equal to Nh and the variation in height dH of each piezoelectric actuator 11 can be equal to N times the value of the variation in height dh of a constituent element 1. By choosing N appropriately, a sufficiently large variation dH, as desired, can therefore be obtained.

However, in order for the foundation of the stacks of elements 1 to be good, and for the solidity of the actuators 11 to be satisfactory, it is vital to give each element 1 a large area (this area being determined partly by the length l and partly by the dimension x, which is therefore at least approximately equal to l), so that the pitch p of the actuators 11 on the rigid base 12 cannot in practice be less than 3 mm, which is not sufficiently small for many applications of the mirror 10.

As indicated above, one of the objects of the invention is to lower the value of this pitch p.

The present invention benefits from the fact that, when the electrical voltage V is applied to the piezoelectric wafer 2 via the electrodes 3 and 4 (see FIG. 1), not only does the height h undergo a variation $dh=d_{33}V$ as a consequence of the direct piezoelectric effect, but that the length l also undergoes a variation dl through the transverse piezoelectric effect. This variation in length dl, due to the transverse piezoelectric effect, is such that $dl/l=d_{31}E=d_{31}V/h$, in which expression $d_{31}$ is the transverse charge coefficient of the piezoelectric material.

To be sure, this transverse charge coefficient $d_{31}$ is less than the direct charge coefficient $d_{33}$ (generally $d_{31}$ is at most equal to half of $d_{33}$, depending on the piezoelectric material of the wafer 2), but it is important to note from the preceding that $dl=d_{31}lV/h$, that is the variation in length dl due to the transverse piezoelectric effect is an increasing function not only of the voltage V, but also of the length l, and is a decreasing function of the height h.

Thus, in spite of the low value of the transverse charge coefficient $d_{31}$, it is possible to obtain a variation in length dl of satisfactory amplitude by choosing sufficiently large l and V and sufficiently small h.

Figure 4:
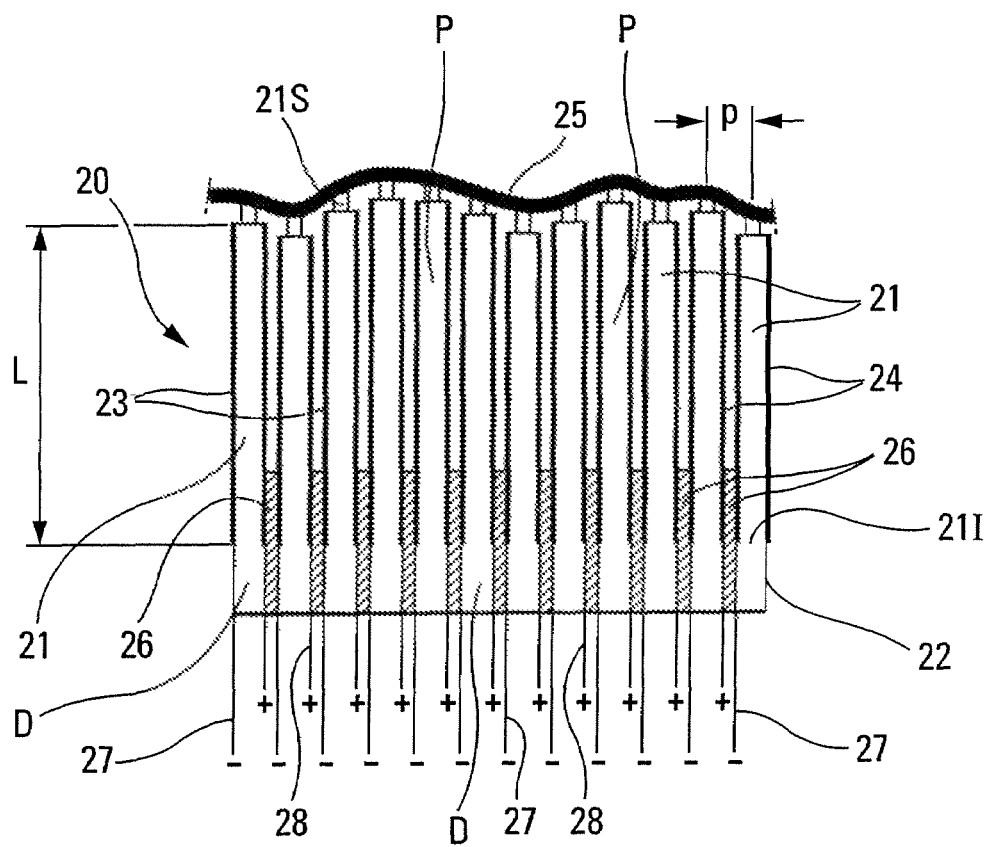
FIG. 4 is a diagram illustrating the structure of the piezoelectric adaptive mirror in accordance with the present invention.

The present invention applies the above observations. Indeed, the adaptive mirror 20 in accordance with the present invention and shown in FIG. 4 is noteworthy in that:

it comprises a plurality of identical, rectangular monolithic combs P made of piezoelectric material (such a comb is shown in FIG. 3), of which each tooth forms a monolithic bar 21 with one end 21I joined to the back D of the corresponding comb. Said bars 21 are, for example, of square section (h=x). The value L of the length l of said bars 21 is chosen to obtain a desired variation in length $dL=d_{31}LV/h$;

the monolithic combs P are joined to one another by their juxtaposed backs D to form a base 22. In this way each back D forms a slice of said base 22. After joining said combs P, for example by bonding, said monolithic bars 21 of the various combs are arranged in rows and in columns to form a matrix;

each monolithic bar 21 is provided with two electrodes 23 and 24 (similar to electrodes 3 and 4 above) positioned on the opposing longitudinal faces of said bar; and a flexible reflecting surface 25 is borne by the other end 21S of the bars 21, so as to be locally deformed by each of these when their length L varies.

Furthermore, electrically insulating spacers 26 are interposed between the adjacent monolithic combs P insulating each electrode 23 of a bar from the opposite electrode 24 of an adjacent bar 21.

Advantageously, the contacts 27, 28 of the electrodes 23, 24 cross the base 22 so as to be accessible from the side of the latter opposite said monolithic bars 21.

It will readily be understood that the monolithic bars 21 can, without damaging their solidity, have cross sections hx smaller than the cross section lx of the composite bars 11. The pitch p of the monolithic bars 21 can therefore be smaller than the pitch p of the composite bars 11.

In one particular exemplary embodiment, a piezoelectric material with a transverse charge coefficient $d_{31}$ equal to $1.3 \times 10^{-10}$ meters/volt was used to produce the monolithic combs P. An electrical voltage V equal to ±400 V was chosen. The monolithic bars 21 had a square section hx, with h=x=0.7 mm, and a length L equal to 20 mm. It is then easy to calculate that dL is between −1.5 micrometers and +1.5 micrometers, which provides a total stroke of 3 micrometers.

By choosing spacers 26 of 0.3 mm, the pitch p is equal to 1 mm.

The invention claimed is:

1. An adaptive mirror comprising:
a plurality of bar-shaped piezoelectric actuators joined to a rigid base by one of their ends and provided with electrodes in virtue of which electrical voltages can be applied to said piezoelectric actuators to generate electric fields therein; and
a flexible reflecting surface, borne by the other of the ends of said piezoelectric actuators and able to be locally deformed by each of these, the length of which varies under the action of said electric fields, wherein:
said adaptive mirror comprises a plurality of monolithic combs of piezoelectric material placed side by side and attached to one another, each comb comprising teeth forming monolithic bars and a back forming a slice of said base and
each monolithic bar of piezoelectric material is provided with:
a first electrode disposed on a first longitudinal face of said monolithic bar and having a first polarity, and
a second electrode disposed on a second longitudinal face of said monolithic bar, opposed to said first longitudinal face, and having a second polarity opposed to said first polarity to form one actuator using a transverse piezoelectric effect.

2. The adaptive mirror as claimed in claim 1, wherein said monolithic bars are square in section.

3. The adaptive mirror as claimed in claim 2 wherein electrically insulating spacers are arranged between adjacent monolithic combs.

4. The adaptive mirror as claimed in claim 3, wherein the contacts of the electrodes of said monolithic bars cross said base so as to be accessible from the side of the latter opposite said monolithic bars.

5. The adaptive mirror as claimed claim 2, wherein the contacts of the electrodes of said monolithic bars cross said base so as to be accessible from the side of the latter opposite said monolithic bars.

6. The adaptive mirror as claimed in claim 1, wherein electrically insulating spacers are arranged between adjacent monolithic combs.

7. The adaptive mirror as claimed in claim 6, wherein the contacts of the electrodes of said monolithic bars cross said base so as to be accessible from the side of the latter opposite said monolithic bars.

8. The adaptive mirror as claimed in claim 1, wherein the contacts of the electrodes of said monolithic bars cross said base so as to be accessible from the side of the latter opposite said monolithic bars.

* * * * *